(12) United States Patent
McCaffrey et al.

(10) Patent No.: US 10,053,999 B2
(45) Date of Patent: Aug. 21, 2018

(54) RADIAL POSITION CONTROL OF CASE SUPPORTED STRUCTURE WITH AXIAL REACTION MEMBER

(71) Applicant: United Technologies Corporation, Hartford, CT (US)

(72) Inventors: Michael G. McCaffrey, Windsor, CT (US); Brandon T. Rouse, Anacortes, WA (US); Mark Borja, Palm Beach Gardens, FL (US); Igor S. Garcia, Salem, CT (US); John R. Farris, Bolton, CT (US); Thomas Almy, Rocky Hill, CT (US); Brian R. Pelletier, Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 283 days.

(21) Appl. No.: 14/781,263

(22) PCT Filed: Apr. 7, 2014

(86) PCT No.: PCT/US2014/033149
§ 371 (c)(1),
(2) Date: Sep. 29, 2015

(87) PCT Pub. No.: WO2015/023321
PCT Pub. Date: Feb. 19, 2015

(65) Prior Publication Data
US 2016/0053624 A1 Feb. 25, 2016

Related U.S. Application Data

(60) Provisional application No. 61/813,423, filed on Apr. 18, 2013.

(51) Int. Cl.
*F01D 9/04* (2006.01)
*F01D 11/08* (2006.01)
(Continued)

(52) U.S. Cl.
CPC ............... *F01D 11/08* (2013.01); *F01D 9/04* (2013.01); *F01D 11/12* (2013.01); *F01D 11/14* (2013.01);
(Continued)

(58) Field of Classification Search
None
See application file for complete search history.

(56) References Cited

U.S. PATENT DOCUMENTS 4,317,646 A * 3/1982 Steel ..................... F01D 11/18
415/116
5,062,767 A * 11/1991 Worley .................. F01D 9/042
415/190

(Continued)

OTHER PUBLICATIONS

International Preliminary Report on Patentability for Application No. PCT/US2014/033149 dated Oct. 29, 2015.
(Continued)

*Primary Examiner* — Woody Lee, Jr.
*Assistant Examiner* — Theodore Ribadeneyra
(74) *Attorney, Agent, or Firm* — Carlson, Gaskey & Olds, P.C.

(57) ABSTRACT

A radial position control assembly for a gas turbine engine stage includes a case structure. A supported structure is operatively supported by the case structure. A support ring operatively supports the supported structure. The supported structure and the support ring have different coefficients of thermal expansion. A sealing structure is adjacent to the supported structure. The support ring maintains the supported structure relative to the sealing structure at a clearance during thermal transients based upon a circumferential gap between adjacent supported structure and based upon a radial gap between the support ring and the supported structure. A pin supports the supported structure relative to the case structure and is configured to isolate the support ring from loads on the supported structure.

15 Claims, 5 Drawing Sheets

(51) Int. Cl.
  *F01D 11/22*  (2006.01)
  *F01D 11/12*  (2006.01)
  *F01D 11/14*  (2006.01)
  *F01D 11/20*  (2006.01)
  *F01D 11/24*  (2006.01)
  *F01D 25/24*  (2006.01)

(52) U.S. Cl.
  CPC .............. *F01D 11/20* (2013.01); *F01D 11/22* (2013.01); *F01D 11/24* (2013.01); *F01D 25/24* (2013.01); *Y02T 50/672* (2013.01)

(56) References Cited

U.S. PATENT DOCUMENTS

| | | |
|---|---|---|
| 6,877,952 B2 | 4/2005 | Wilson |
| 7,553,128 B2 | 6/2009 | Abdel-Messeh et al. |
| 7,665,962 B1 | 2/2010 | Liang |
| 2003/0049121 A1* | 3/2003 | Dierksmeier ........... F01D 11/18 415/173.1 |
| 2003/0170115 A1 | 9/2003 | Bowen et al. |
| 2008/0206046 A1* | 8/2008 | Razzell ................. F01D 11/005 415/173.1 |
| 2010/0313404 A1 | 12/2010 | Bates |
| 2012/0156007 A1* | 6/2012 | Bacic ..................... F01D 11/20 415/126 |
| 2012/0247124 A1 | 10/2012 | Shapiro et al. |
| 2012/0275898 A1 | 11/2012 | McCaffrey et al. |

OTHER PUBLICATIONS

U.S. Appl. No. 13/554,211 entitled Radial Position Control of Case Supported Structure filed Jul. 20, 2012.
International Search Report and Written Opinion for PCT Application No. PCt/US2014/033149, dated Feb. 24, 2015.

\* cited by examiner

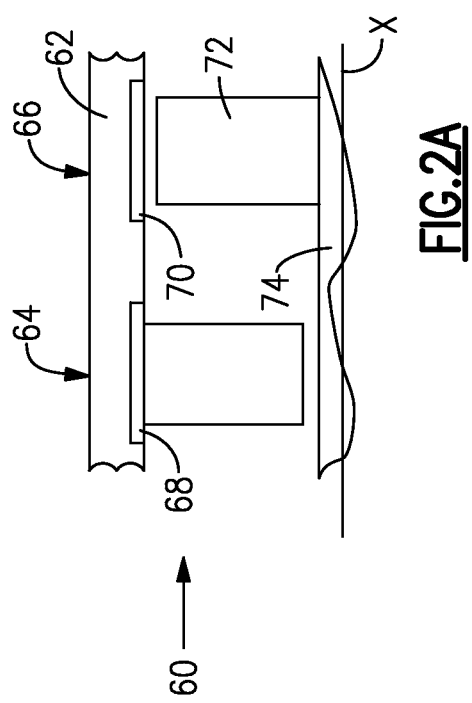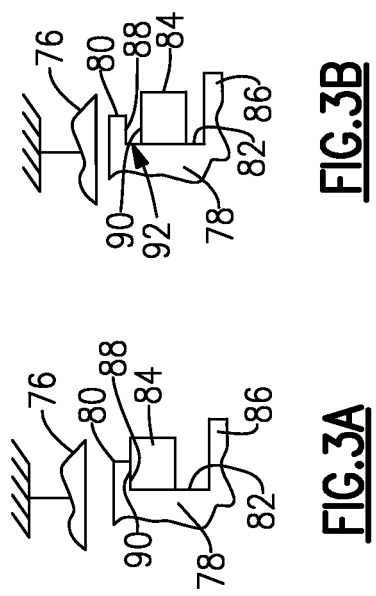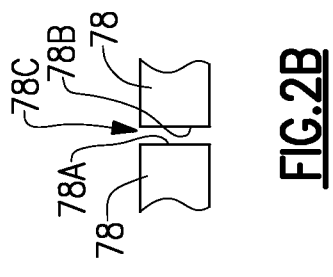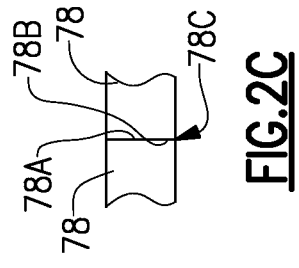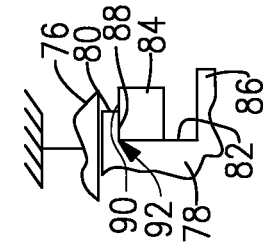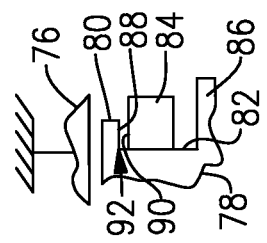

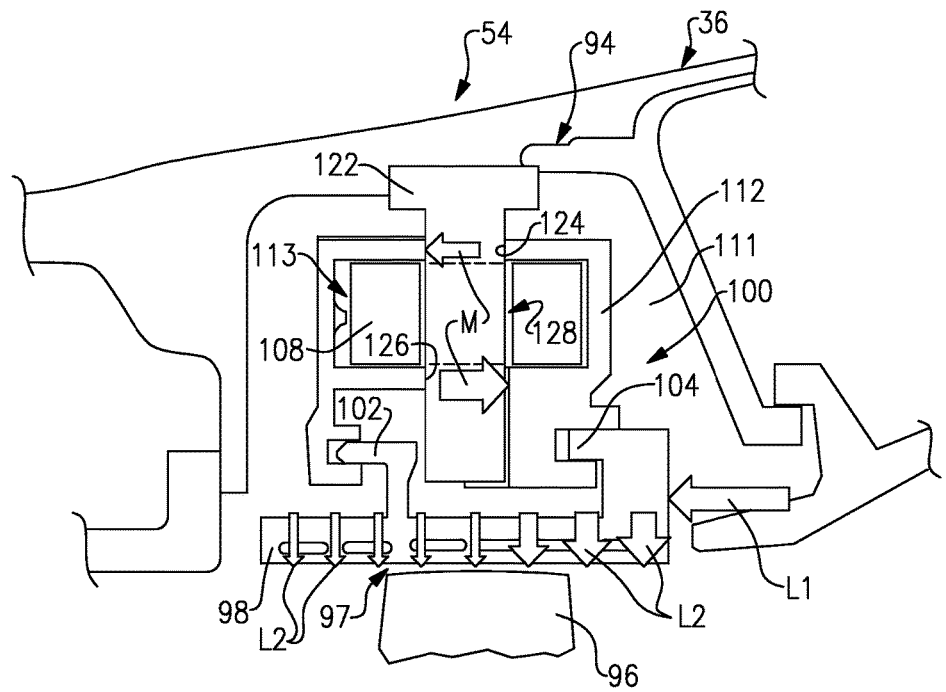
FIG.5A
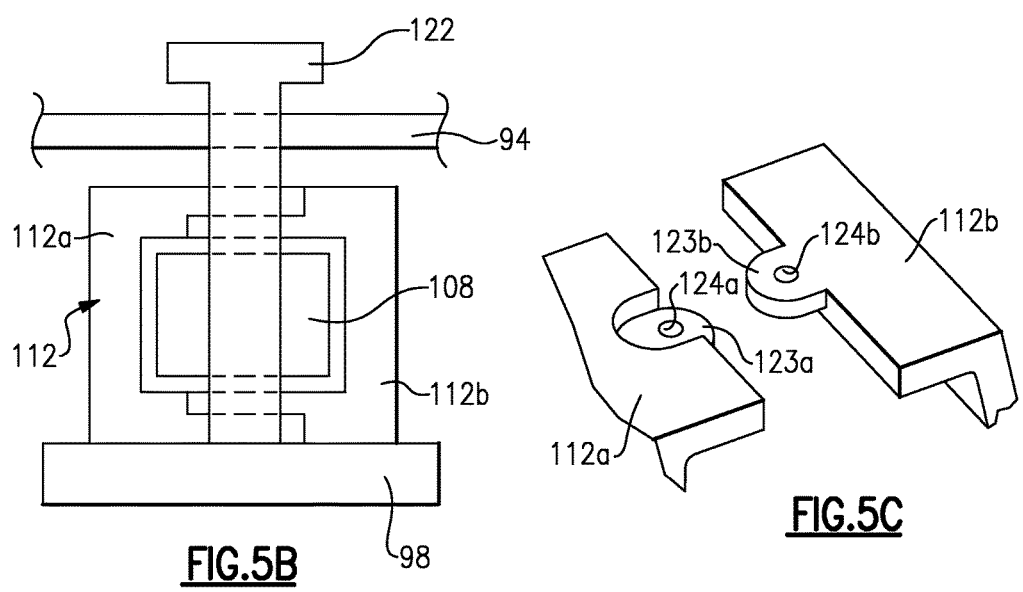
FIG.5B
FIG.5C

RADIAL POSITION CONTROL OF CASE SUPPORTED STRUCTURE WITH AXIAL REACTION MEMBER

This disclosure was made with Government support under contract number N00019-12-D-0002 awarded by the Navy. The Government has certain rights in this disclosure.

BACKGROUND

This disclosure relates to a gas turbine engine having a case, for example, for a turbine section of the engine. More particularly, the disclosure relates to controlling the radial position of a structure supported by the case during thermal transients.

Multiple fixed and rotatable stages are arranged within the case of the engine's static structure. Typically, supported structure, such as stators and blade outer air seals, are fastened to the case. Radial clearances must be provided between the stators, blade outer air seals and adjacent sealing structure of rotating structure, such as rotors and blades. Since the supported structure and case are in close proximity to and affixed relative to one another, the supported structure thermally responds to the bulk case temperature. Thus, during temperature transients the supported structure may move radially inward more than desired, which may cause a rub event.

To avoid rub events, the designed radial clearances between the static and rotating structure are enlarged. During generally steady-state temperatures, the clearances are larger than necessary, which reduces the efficiency of the stage during cruise conditions, for example.

A circumferentially continuous support ring has been suggested support structure, such as a blade outer air seal. The coefficients of thermal expansion of the materials of the support ring and support structure are selected to reduce clearances. Undesired contact loads may be generated between the support ring and support structure during engine operation.

SUMMARY

In one exemplary embodiment, a radial position control assembly for a gas turbine engine stage includes a case structure. A supported structure is operatively supported by the case structure. A support ring operatively supports the supported structure. The supported structure and the support ring have different coefficients of thermal expansion. A sealing structure is adjacent to the supported structure. The support ring maintains the supported structure relative to the sealing structure at a clearance during thermal transients based upon a circumferential gap between adjacent supported structure and based upon a radial gap between the support ring and the supported structure. A pin supports the supported structure relative to the case structure and is configured to isolate the support ring from loads on the supported structure.

In a further embodiment of any of the above, the supported structure is a blade outer air seal and the sealing structure is a blade.

In a further embodiment of any of the above, the supported structure is an outer platform of a vane.

In a further embodiment of any of the above, the vane is arranged in a vane cluster.

In a further embodiment of any of the above, the coefficient of thermal expansion of the support ring is less than the coefficient of thermal expansion of the supported structure. The support ring is a continuous circumferentially unbroken annular structure.

In a further embodiment of any of the above, the support ring is constructed from one of a ceramic matrix composite and a metal alloy. The supported structure is constructed from one of a ceramic matric composite, a metal alloy and a monolithic ceramic.

In a further embodiment of any of the above, the support ring includes first and second states. The supported structure includes expanded and contracted positions in each of the first and second states of the support ring. The circumferential gap is about zero in the expanded state and the circumferential gap is greater than zero in the contracted state. The support ring is enlarged in the second state with respect to the first state. The hook and support ring respectively include first and second surfaces that are radially adjacent to one another to provide the radial gap. The radial gap is about zero in first and fourth conditions. The first condition with the support ring is in the first state and the supported structure is contracted. The fourth condition with the support ring is in the second state and the support structure is contracted. The radial gap is greater than zero in second and third conditions. The second condition with the support ring is in the first state and the supported structure is expanded. The third condition with the support ring is in the second state and the support structure is expanded.

In a further embodiment of any of the above, the first condition corresponds to a cold condition. The second condition corresponds to a warm condition. The third condition corresponds to a hot condition. The fourth condition corresponds to a rapid deceleration condition from the hot condition.

In a further embodiment of any of the above, the support structure includes fore and aft hooks received by carrier structures.

In a further embodiment of any of the above, the supported structure includes a carrier and a blade outer air seal. The carrier has a cavity that receives the support ring and first and second apertures. The pin extends through the support ring and the first and second apertures.

In a further embodiment of any of the above, the loads generate a moment in the carrier that are transmitted to the case structure through the pin.

In a further embodiment of any of the above, the carrier includes first and second carrier portions secured to one another about the support ring by the pin.

In a further embodiment of any of the above, the first and second carrier portions include overlapping tabs each receiving a hold aligned with one another to receive the pin.

In a further embodiment of any of the above, the pin includes a fluid aperture that is configured to supply a cooling fluid to at least one of the support ring and the supported structure to control the clearance.

In a further embodiment of any of the above, the radial position control assembly includes a cooling source in fluid communication with the fluid aperture, and a controller in communication with a clearance position sensor configured to detect a tip clearance between a blade and a blade outer air seal, the controller configured to command a control valve to selectively regulate a flow of the cooling fluid from the cooling source to the fluid aperture.

In a further embodiment of any of the above, the radial position control assembly includes a clearance position sensor configured to detect a tip clearance between a blade and a blade outer air seal. The clearance sensor is supported by the pin.

BRIEF DESCRIPTION OF THE DRAWINGS

The disclosure can be further understood by reference to the following detailed description when considered in connection with the accompanying drawings wherein:

FIG. 2A is a schematic view of a section of the engine illustrating both fixed and rotatable stages.

FIG. 2B is a schematic view depicting circumferentially adjacent supported structures having a circumferential gap.

FIG. 2C depicts the supported structures of FIG. 2B without the circumferential gap.

FIG. 3A schematically depicts a first condition corresponding to a support ring in a first state and a supported structure in a contracted position.

FIG. 3B schematically depicts a second condition corresponding to the support ring in the first state and the supported structure in an expanded position.

FIG. 3C schematically depicts a third condition corresponding to the support ring in a second state and the supported structure in an expanded condition.

FIG. 3D schematically depicts a fourth condition corresponding to the support ring in the second state and the supported structure in the contracted position.

FIG. 5A illustrates an example radial position control assembly.

FIG. 5B depicts an example multi-piece carrier.

FIG. 5C is a perspective view of the multi-piece carrier shown in FIG. 5B.

DETAILED DESCRIPTION

Figure 1:
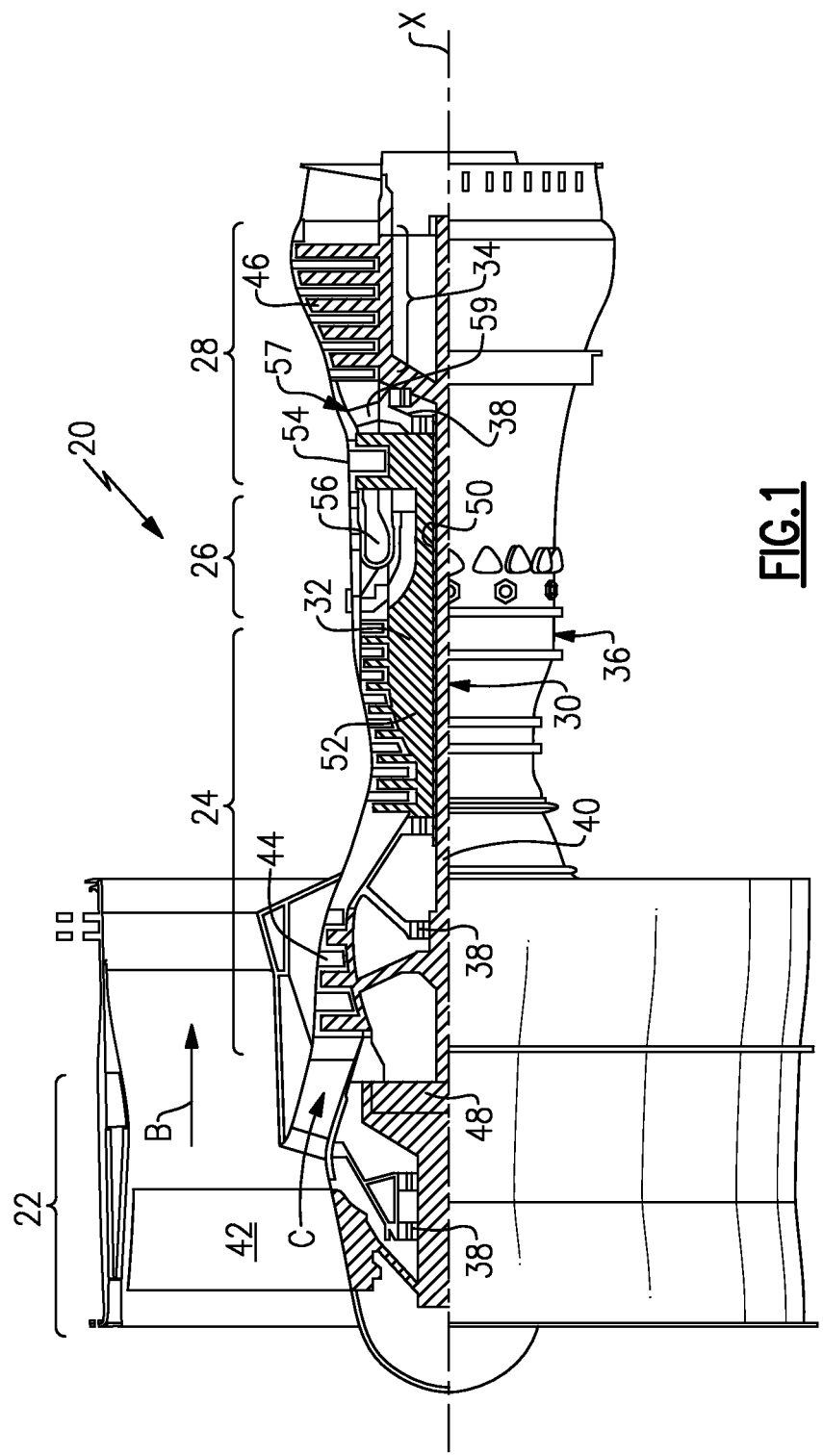
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

FIG. 2A illustrates a section 60 of the engine 10, for example, a turbine section. The section 60 includes a case structure 62 of the engine static structure 36. The case structure 62 includes a fixed stage 64 and a rotatable stage 66. The fixed stage 64 includes an array of stator vanes, and the rotatable stage 66 includes an array of blades 72 mounted on a rotor 74 rotatable about the axis X. In the fixed stage, a supported structure 68, such as an outer platform of one or more vanes, is operatively supported by the case structure 62. An inner diameter of the vanes seals relative to rotatable structure, such a rotor. In the rotatable stage 66, a supported structure 70, such as a blade outer air seal (BOAS), is operatively supported by the case structure 62. It is desirable that the desired radial clearance within the fixed stage and rotatable stage 64, 66 is minimal to maintain high operating efficiency through the section 60 during various operating conditions and transients. A typical desired clearance between the supported structure and the adjacent sealing structure is 0.000-0.010 inch (0.00-0.25 mm) at cruise.

To this end, a radial position control system is used to regulate the radial position of supported structure 78 relative to the case structure 76, as illustrated in FIGS. 3A-3D. These supported structures 78 include at least one hook 80, which defines an annular recess 82 that opens to a lateral side of the supported structure. A support ring 84 is received within the recess 82. In the example, the support ring is a continuous, unbroken structure about its circumference (e.g., support ring 108, FIG. 4B). However, this is not to say that the support ring 84 cannot be formed by a multiple interlocking segments. Rather, the support ring 84 should be provided by a continuous structure such that the structure cannot circumferentially uncouple about its circumference. That is, the support ring 84 should expand and contract as a single unitary structure.

The supported structure 78 and the support ring 84 have different coefficients of thermal expansion (CTE). The support ring 84 has a lower CTE than the support structure 78 such that the support structure 78 expands and contracts more quickly than the support ring 84. In this manner, the support ring 84 is more dimensionally stable during thermal transients. In one example, the support ring 84 is a ceramic matrix composite or a metal alloy, and the supported structure 78 is a ceramic matrix composite, metal alloy or monolithic ceramic.

The supported structure 78 includes a member 86, which may be a stator vane or blade outer air seal, for example. It is desirable to control the radial position of member 86 during thermal transients. The difference in coefficients of thermal expansion between the supported structure 78 and the support ring 84 controls the radial position of the member 86 relative to its adjacent sealing structure.

Referring to FIG. 3A-3B, the first and second surfaces 88, 90 are respectively provided by the hook 80 and the support ring 84. The first and second surfaces 88, 90 are radially adjacent to and engageable with one another during certain conditions, discussed below. Referring to FIG. 2B, the first and second surfaces 78A and 78B of the circumferentially adjacent supported structures 78 create a gap 78C, and are engageable with one another during certain conditions discussed below.

Referring to FIGS. 3A-3B, the support ring 84 is illustrated in a first state, which is at a lower temperature and contracted compared to a second state (shown in FIG. 3C-3D). With continuing reference to FIG. 3A, the supported structure 78 is shown in a first condition (cold) in which the first and second surfaces 88, 90 are contacting one another, eliminating the gap 92. Surfaces 78A and 78B are not in contact providing gap 78C, best shown in FIG. 2B. In this condition, the support ring 84 is loaded.

As the supported structure 78 expands more rapidly than the support ring 84, the member 86 will move to the second condition (warm), shown in FIG. 3B, During the heating process, a point occurs where the supported structure 78 increases in temperature and expands, and the circumferential growth of supported structure 78 increases to a point when the gap 78C is reduced to zero, best shown in FIG. 2C. Up to this point, the supported structure 78 is still loading support ring 84. This transient point in heating of supported structure 78 is called the "lock-up" point. In this transient condition, between the first condition and the second condition, the first and second surfaces 88, 90 are still engaged with one another but the support ring 84 is no longer loaded.

With the gap 78C reduced to zero, any further heating of supported structure 78, will cause its circumference to grow as if they were made as a solid, full ring structure. Since the supported structure 78 has a higher CTE than the support ring 84 any further heating of the supported structure 78 will result in the gap 92 to increase from zero. When the support structure 78 reaches the second condition, the circumferential growth of the supported structure 78 has increased to the point where the gap 92 is large, and the support ring 84 is unloaded. Eventually during sustained high temperatures, the support ring 84 will expand, providing an enlarged diameter or second state relative to the first state, as shown in FIG. 3C, which corresponds to the third condition (hot). It should be understood the terms "cold," "warm," and "hot" are intended to be relative terms. Since the first and second surfaces 88, 90 are disengaged from one another, the expanded support ring 84 will not control the radial position of the supported structure 78.

Referring to FIG. 3D, during a rapid cool down, such as a rapid deceleration, the supported structure 78, which has a higher CTE, will more rapidly contract than the support ring 84. During the cool down transition, the circumferential length of supported structure 78 decreases until the circumferential length at gap 92 equals the circumference of the support ring 84. At this point the support structure 78 has cooled enough that the gap 92 has closed, and the gap 78C begins to open, this transient point is known as "un-lock". In this condition, the support ring 84 is starts to become loaded. As cooling continues the gap 78C get larger, and the radial position of the supported structure 78 is controlled by the support ring 84. Beneficially, the support ring 84, which has a lower CTE, will remain generally in the second state, which prevents the supported structure 78 from moving too far radially inward. Thus, during the cool down the support structure 78 is controlled by a slower cooling and different growth rate support ring 84.

When the support ring 84 is in the second state, and the supported structure 78 is cooling back to the first state, the support structure 78 is held at a larger radial position. Thus, if a re-heating event was to occur at this time, quickly raising the supported structure back to the second state, it will already be partially in a larger radial position.

Figure 4A:
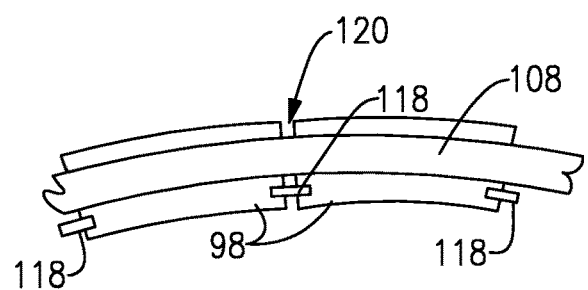
FIG. 4A illustrates the supported structure, such as an array of blade outer air seals, in a rotatable stage.
Figure 4B:
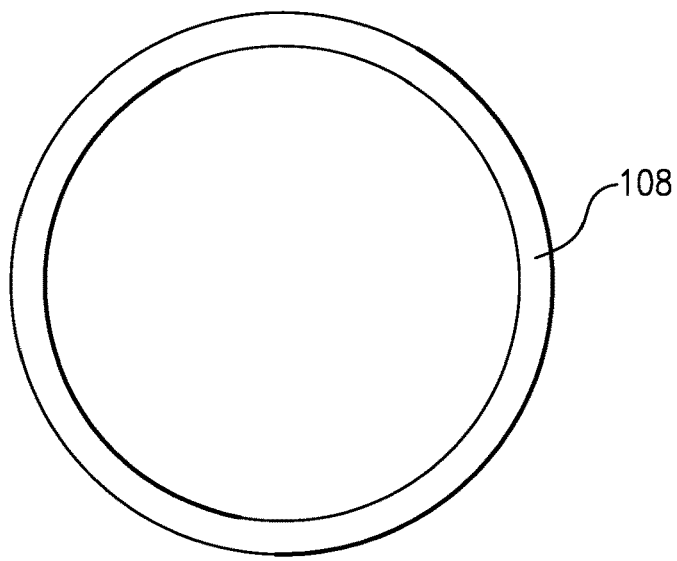
FIG. 4B depicts an example support ring.

As illustrated in FIG. 4A, an array of circumferentially arranged BOAS 98 is positioned relative to one another about the support rings. During cold conditions, a circumferential gap 120 is provided between adjacent BOAS 98, which are supported by at least one support ring 108 (best shown in FIG. 4B). A seal, such as a feather seal 118 is provided between the adjacent BOAS 98 to seal the circumferential gap 120. The circumferential gaps 120 close in the second condition (schematically illustrated in FIG. 3B), and the radial gaps between the support rings and the BOAS 98 behave as described above with respect to FIGS. 3A-3D.

Figure 4C:
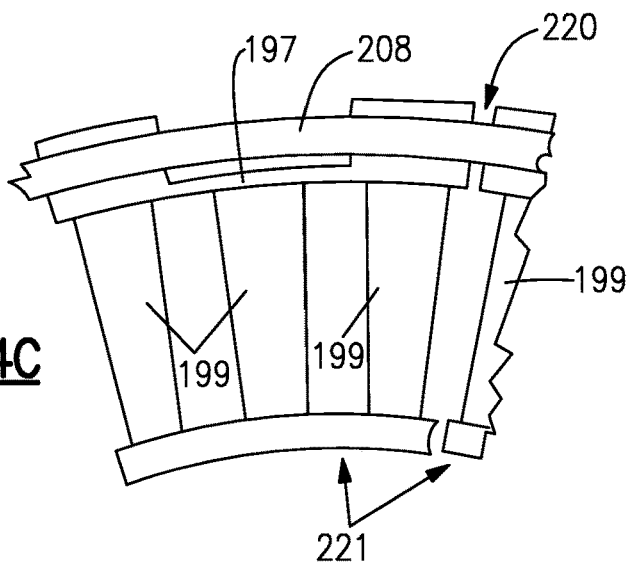
FIG. 4C depicts an array of stator vanes.

As illustrated in FIG. 4C, an array of circumferentially arranged vanes 199 are positioned relative to one another about the support rings. In the example shown, the vanes 199 may be arranged in clusters 221 about the support rings. During core conditions, a circumferential gap 220 is provided between adjacent BOAS 198. The circumferential gaps 220 close in the second condition (schematically illustrated in FIG. 3B), and the radially gaps between the support rings and the outer platform 197 behave as described above with respect to FIGS. 3A-3D.

One example implementation of the arrangements shown in FIGS. 3A-3D is illustrated in FIG. 5A. The high pressure turbine section 54 includes a turbine case 94, which may be provided by one or more components. A BOAS 98 is operatively supported relative to the high pressure turbine case 94 via a carrier 112 to which the BOAS 98 is mounted. In the example, the BOAS 98 is operatively connected by fore and aft hooks 102, 104 to the carrier 112. The carrier 112 includes fore and aft structures 114, 116 each having a recess 106 that receives the fore and aft hooks 102, 104. The support ring 108 supports the carrier 112 and, in the example, is arranged within a cavity 113 of the carrier 112.

In an example with a single piece support ring 108, the carrier 112 may be provided in multiple pieces to facilitate assembly of the support ring 108 within the cavity 113 of the carrier 112 (see, e.g., FIG. 5B). In the case of a multi-piece support ring 108, a single piece carrier segment may be used.

A blade 96 is adjacent to the BOAS 98, which is received in an annular pocket 100 of the turbine case 94. Seals 110, 111 are arranged within the pocket 110 to seal the BOAS 98 and/or carrier 112 relative to the turbine case 94. A sufficient but tight operating clearance 97 is desired between the tip of the blade 96 and the BOAS 98 throughout various engine operating conditions. To this end, a variable clearance is provided between the support ring 108 and the carrier 112 throughout engine operation in the manner described above with respect to FIGS. 3A-3D.

Externally applied axial and radial loads L1, L2 applied on the BOAS 98 during engine operation, for example, from non-uniform gas path pressures, generate unequally distributed loads on the support ring 108, which induces a moment M. The moment M may transfer loads from the carrier 112 to the support ring 108. The circumferentially segmented carriers 112 could experience undesirably high contact loads and high friction forces that impede desired relative radial translation between the support ring 108 and carrier 112 described relative to FIGS. 3A-3D.

Pins 122 are used to isolate the moment M generated by the carrier 112 from the support ring 108 to reduce the contact loads and friction forces between the carrier 112 and support ring 108. In the example, each pin 122, which extends radially, is operatively supported by the turbine case 94 and extends through first and second apertures 124, 126 in the carrier 112. One or more pins 122 may be provided for supported structure, here the carrier 112 and BOAS 98. A clearance 128 between the pin 122 and the support ring 108 is sufficiently large such that the pin 122 and support ring 108 will not bind, permitting the moment to be transferred to the turbine case 94 through the pin 122 while avoiding the transmission of a substantial amount of the axial loads from the carrier 112 to the support ring 108.

Referring to FIGS. 5B and 5C, the pin 122 is used to secure carrier portions 112a, 112b to one another about the support ring 108. The carrier portions 112a, 112b respectively include tabs 123a, 123b that overlap one another in an assembled position. Holes 124a, 124b of the tabs 123a, 123b align with one another in the assembled position to receive the pin 122. In this manner, the use of threaded fasteners may be avoided, which may be desirable for assembly and disassembly.

Figure 6:
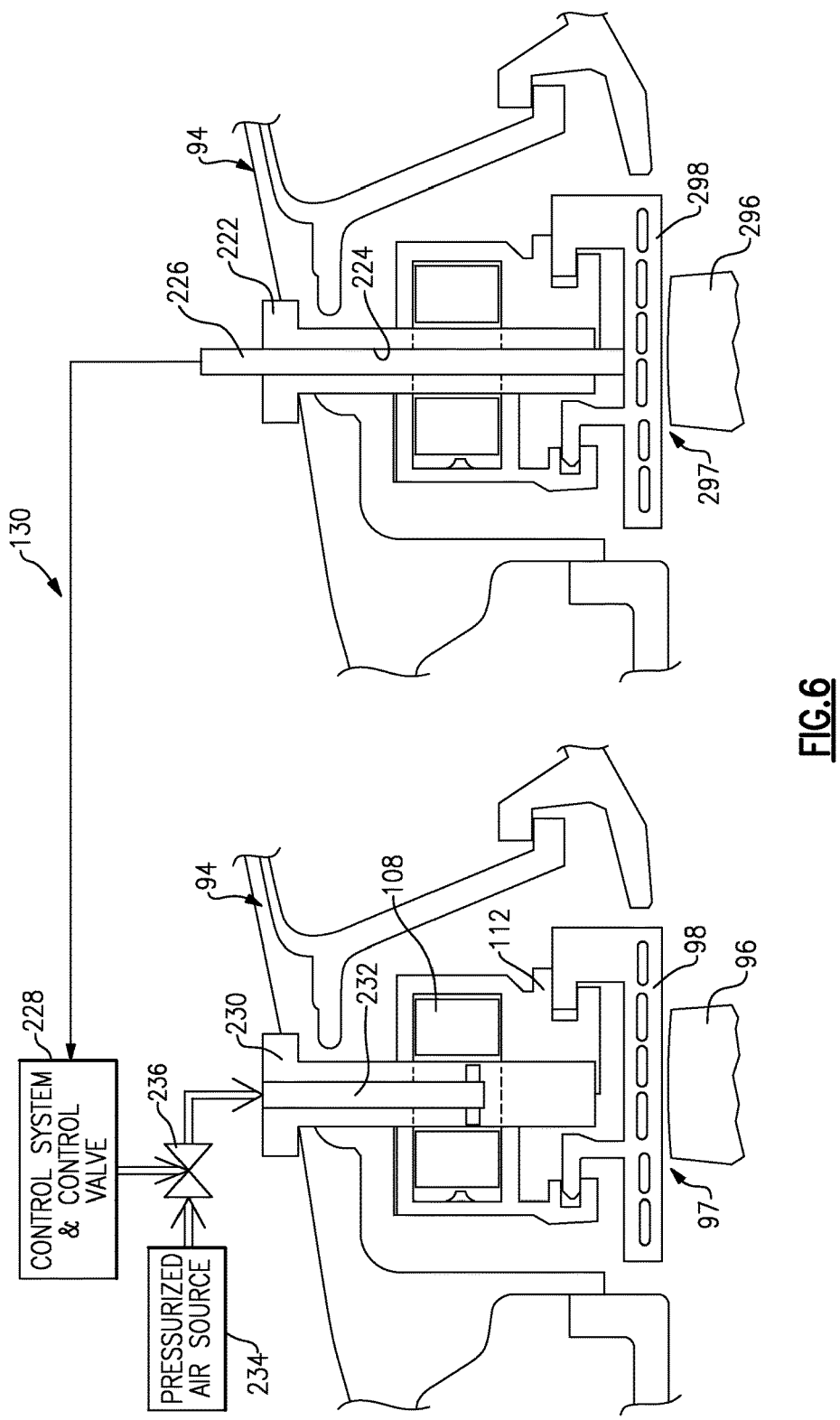
FIG. 6 illustrates another example radial position control assembly.

An active clearance control system 130 is shown in FIG. 6. Although the example system is shown as multiple turbine stages, the active clearance control system 130 may be provided in a single stage. The system 130 includes a first pin 222 with an aperture 224 that receives a tip clearance sensor 226. The tip clearance sensor 226, which may be a microwave sensor, detects the clearance 297 between the blade 296 and the BOAS 298. The tip clearance sensor 226 communicates with a controller 228.

A second pin 230 includes an aperture 232 that is in fluid communication with a fluid cooling source 234, such as compressor bleed air. Cooling fluid is delivered to the support ring 108 and/or the supported structure, in the example, the BOAS 98, to control the clearance 97 between the BOAS 98 and the blade 96.

A control valve 236 is in communication with the controller 228 and is configured to receive a command from the controller 228 to selectively regulate fluid from the fluid cooling source 234 to the support ring 108 and/or the supported structure, in the example, the BOAS 98 and carrier 112.

The tip clearance sensor 226 and cooling aperture 232 may be supported by or provided by structures other than the first and second pins 222, 230. However, the pins 222, 230 may be configured to penetrate the turbine case 94, providing a convenient location for the tip clearance sensor 226 and cooling aperture 232.

Although an example embodiment has been disclosed, a worker of ordinary skill in this art would recognize that certain modifications would come within the scope of the claims. For that reason, the following claims should be studied to determine their true scope and content.

What is claimed is:

1. A radial position control assembly for a gas turbine engine stage comprising:
   a case structure;
   a supported structure operatively supported by the case structure, wherein the supported structure includes a carrier and a blade outer air seal;
   a support ring operatively supporting the supported structure, the supported structure and the support ring having different coefficients of thermal expansion, the carrier having a cavity receiving the support ring and first and second apertures;
   a sealing structure adjacent to the supported structure, the support ring maintaining the supported structure relative to the sealing structure at a clearance during thermal transients based upon a circumferential gap between adjacent supported structure and based upon a radial gap between the support ring and the supported structure; and
   a pin supporting the supported structure relative to the case structure and configured to isolate the support ring from loads on the supported structure, the pin extending through the support ring and the first and second apertures.

2. The radial position control assembly according to claim 1, wherein the sealing structure is a blade.

3. The radial position control assembly according to claim 1, wherein the supported structure is an outer platform of a vane.

4. The radial position control assembly according to claim 3, wherein the vane is arranged in a vane cluster.

5. The radial position control assembly according to claim 1, wherein the coefficient of thermal expansion of the support ring is less than the coefficient of thermal expansion of the supported structure, and the support ring is a continuous circumferentially unbroken annular structure.

6. The radial position control assembly according to claim 5, wherein the support ring is constructed from one of a ceramic matrix composite and a metal alloy, and the supported structure is constructed from one of a ceramic matrix composite, a metal alloy and a monolithic ceramic.

7. A radial position control assembly for a gas turbine engine stage comprising:
   a case structure;
   a supported structure operatively supported by the case structure;
   a support ring operatively supporting the supported structure, the supported structure and the support ring having different coefficients of thermal expansion, wherein the coefficient of thermal expansion of the support ring is less than the coefficient of thermal expansion of the supported structure, and the support ring is a continuous circumferentially unbroken annular structure;
   a sealing structure adjacent to the supported structure, the support ring maintaining the supported structure relative to the sealing structure at a clearance during thermal transients based upon a circumferential gap between adjacent supported structure and based upon a radial gap between the support ring and the supported structure;
   a pin supporting the supported structure relative to the case structure and configured to isolate the support ring from loads on the supported structure; and
   wherein the support ring includes first and second states, and the supported structure includes expanded and contracted positions in each of the first and second states of the support ring, wherein the circumferential gap is about zero in the expanded state and the circumferential gap is greater than zero in the contracted state, wherein the support ring is enlarged in the second state with respect to the first state, a hook on the support structure and the support ring respectively include first and second surfaces that are radially adjacent to one another to provide the radial gap, and the radial gap is about zero in first and fourth conditions, the first condition with the support ring in the first state and the supported structure contracted, and the fourth condition with the support ring in the second state and the support structure contracted, the radial gap greater than zero in second and third conditions, the second condition with the support ring in the first state and the supported structure expanded, and the third condition with the support ring in the second state and the support structure expanded.

8. The radial position control assembly according to claim 7, wherein the first condition corresponds to a cold condition, the second condition corresponds to a warm condition, the third condition corresponds to a hot condition, and the fourth condition corresponds to a rapid deceleration condition from the hot condition.

9. The radial position control assembly according to claim 5, wherein the support structure includes fore and aft hooks received by carrier structures.

10. The radial position control assembly according to claim 1, wherein the loads generate a moment in the carrier that are transmitted to the case structure through the pin.

11. The radial position control assembly according to claim 1, wherein the carrier includes first and second carrier portions secured to one another about the support ring by the pin.

12. The radial position control assembly according to claim 11, wherein the first and second carrier portions include overlapping tabs each receiving a hold aligned with one another to receive the pin.

13. The radial position control assembly according to claim 1, wherein the pin includes a fluid aperture configured to supply a cooling fluid to at least one of the support ring and the supported structure to control the clearance.

14. The radial position control assembly according to claim 13, comprising a cooling source in fluid communication with the fluid aperture, and a controller in communication with a clearance position sensor configured to detect a tip clearance between a blade and a blade outer air seal, the controller configured to command a control valve to selectively regulate a flow of the cooling fluid from the cooling source to the fluid aperture.

15. The radial position control assembly according to claim 1, comprising a clearance position sensor configured to detect a tip clearance between a blade and a blade outer air seal, the clearance sensor supported by the pin.

* * * * *